United States Patent
Lohtia et al.

(10) Patent No.: US 7,116,708 B2
(45) Date of Patent: Oct. 3, 2006

(54) CONTROLLING THE RATE OF DATA TRANSFER OVER A WIRELESS LINK

(75) Inventors: Anit Lohtia, Plano, TX (US); David W. Paranchych, Richardson, TX (US); Yuqiang Tang, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 735 days.

(21) Appl. No.: 10/183,809

(22) Filed: Jun. 27, 2002

(65) Prior Publication Data
US 2004/0001536 A1    Jan. 1, 2004

(51) Int. Cl.
*H04Q 1/20* (2006.01)

(52) U.S. Cl. .................................................. 375/225

(58) Field of Classification Search ............ 375/225, 375/224, 259, 377, 316, 295, 340, 346, 354; 341/61, 50; 370/230, 229, 464, 465, 470, 370/472; 455/115.1, 91, 130, 226.1
See application file for complete search history.

(56) References Cited

U.S. PATENT DOCUMENTS 6,075,798 A * 6/2000 Lyons et al. ............... 370/474
6,741,563 B1 * 5/2004 Packer ....................... 370/231
6,888,796 B1 * 5/2005 Iizuka ........................ 370/232
6,898,437 B1 * 5/2005 Larsen et al. ............... 455/522
6,930,981 B1 * 8/2005 Gopalakrishnan et al. .. 370/252

OTHER PUBLICATIONS

Balakrishnan, Hari; Seshan, Serinivasan; Amir, Elan; Katz, Randy H., "Improving TCP/IP Performance over Wireless Networks", 1995, Berkeley, Mobicom 95.*
3rd Generation Partnership Project, "3GPP TR 25.855 V2.0.0," pp. 1-28 (Sep. 2001).
3rd Generation Partnership Project 2, 3GPP2C.S0024, Version 2.0, "cdma2000 High Rate Packet Data Air Interface Specification," pp. 1-1-11-5 (Oct. 2000).

* cited by examiner

*Primary Examiner*—Pankaj Kumar
(74) *Attorney, Agent, or Firm*—Trop, Pruner & Hu, P.C.

(57) ABSTRACT

A wireless communications network includes a mobile station and wireless access equipment. In communications between the wireless access equipment and the mobile station (such as in the forward link), a data rate is specified. However, the effective data rate can be reduced (with respect to the specified data rate) if it is determined that the specified data rate is not needed. In one arrangement, the effective data rate is reduced by waiting to fill a physical layer packet before transmission.

20 Claims, 3 Drawing Sheets

CONTROLLING THE RATE OF DATA TRANSFER OVER A WIRELESS LINK

TECHNICAL FIELD

This invention relates generally to controlling the rate of data transfer over a wireless link.

BACKGROUND

Generally, mobile communications systems are made up of a plurality of cells. Each cell provides a radio communications center through which a mobile station establishes a call or other communications session with another mobile station or a terminal connected to either a circuit-switched network (e.g., public-switched telephone network or PSTN) or a packet-switched data network. Typically, each cell includes a radio base station, with each base station coupled to a switching center that controls processing of calls or other communications sessions between or among mobile stations or between mobile stations and terminals connected to a circuit-switched or a packet-switched network.

Various wireless protocols exist for defining communications in a wireless network. One type of protocol is based on the time-division multiple access (TDMA) technology, such as the TIA/EIA-136 standard or the Global System for Mobile (GSM) standard. Another type of protocol for wireless communications is based on the code-division multiple access (CDMA) technology. CDMA is a spread spectrum wireless communications protocol in which transmission is based on the spread spectrum modulation technique to allow many users to have access to the same band of carriers.

Traditionally, wireless networks were designed for carrying circuit-switched voice traffic. However, with the wide availability of the Internet and intranets, packet-switched communications (e.g., web browsing, electronic mail, instant messaging, electronic gaming, and so forth) have become common. As a result, third generation (3G) and beyond wireless technologies are being developed to provide higher bandwidth and more efficient packet-switched communications (of data as well as voice and other forms of real-time data) over wireless networks.

Packet-switched wireless communications protocols have been developed for both TDMA and CDMA. For example, in the CDMA context, a CDMA 2000 family of standards has been developed that is capable of supporting both traditional circuit-switched traffic as well as packet-switched traffic.

The first phase of CDMA 2000 is referred to as 1xRTT (also referred to as 3G1X or 1X), which is designed to increase voice capacity as well as to support data transmission speeds that are faster than typically available. In addition, for even higher data rates in packet-switched communications, a High Rate Packet Data (HRPD) wireless technology has been developed. HRPD is defined as TIA/EIA/IS-856, "CDMA 2000, High Rate Packet Data Air Interface Specification," which is adopted by the TIA. The HRPD technology is also referred to as the 1xEV-DO or 1xEV technology. 1xEV-DO provides relatively high data transfer rates over the air interface between mobile stations and base stations (usually faster than 1xRTT rates).

In a 1xEV-DO system, a mobile station can specify the rate of data to be communicated in the forward wireless link (which is the wireless link from the base station to the mobile station). This is specified by the mobile station in a defined indication, referred to as the data rate control (DRC) channel, and can be a function of a specific quality of service to which the mobile station user has subscribed. Given the data rate specified by the mobile station, the 1xEV-DO wireless access equipment (sometimes referred to as an access network) specifies a size of a physical layer packet to be communicated between the wireless access equipment and the mobile station. A physical layer packet is a packet defined by the physical layer of the air interface for carrying certain control information and traffic data over the air interface. Depending upon the size of the physical layer packet, the IS-856 standard specifies that one to four higher level packets, such as medium access control (MAC) packets, can be carried in the physical layer packet. Thus, if a low data rate is specified, then the physical layer packet has a smaller size and can carry fewer packets. On the other hand, if a high data rate is specified, then the physical layer packet has a larger size and can carry a larger number of packets.

However, the data rate that is specified by the mobile station may not be the data rate that is actually needed by, or supplied to, application software in the wireless access equipment. If the mobile station specifies a high data rate, which means that the physical layer packet is larger, then any unused space in the physical layer packet is filled with filler information. The physical layer packet containing useful information and the filler information is then sent to the mobile station over the forward wireless link. Filling the physical layer packet with filler information wastes resources of the forward wireless link.

SUMMARY

In general, improved method and apparatus are provided for controlling data rate over a wireless link between wireless access equipment and mobile stations to improve efficiency in the usage of resources during wireless communication. For example, a method of wireless communication includes receiving an indication of a data rate for communicating data over a wireless link between a mobile station and a wireless access equipment, determining whether the data rate specified by the indication is greater than a rate at which data to be communicated over the wireless link is received by one of the mobile station and wireless access equipment, and reducing an actual data rate of communicating data over the wireless link in response to determining that the data rate specified by the indication is more than is actually needed.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
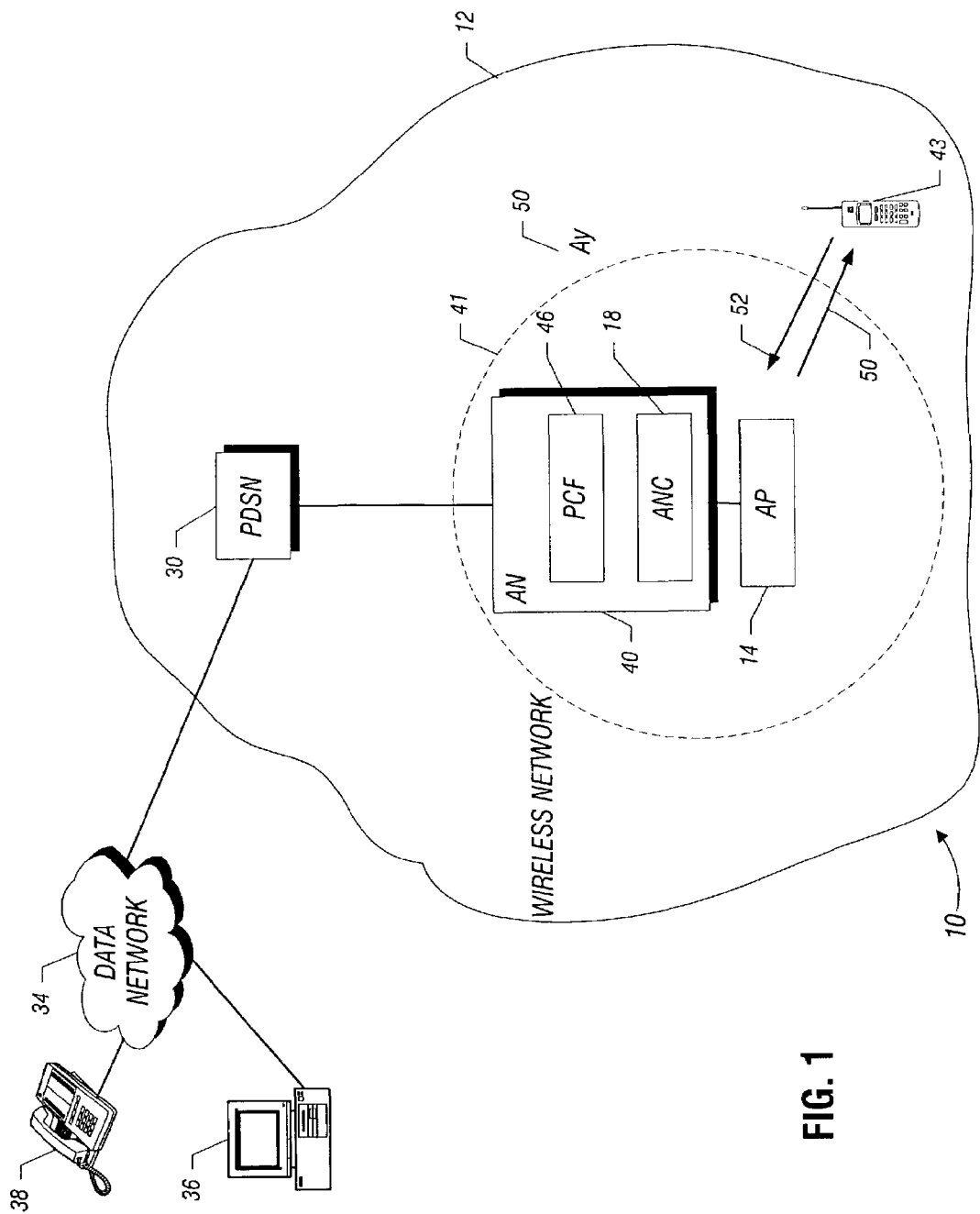
FIG. 1 is a block diagram of an example arrangement of a communications network that includes a packet data wireless network.

Referring to FIG. 1, a wireless communications network 10 has a coverage area designated generally as 12. In one embodiment, the wireless communications network 10 includes components that operate according to the CDMA (code-division multiple access) 2000 protocol. CDMA 2000 is defined by the CDMA 2000 family of standards (collectively referred to as the IS-2000 Standard), which is developed by the Third Generation Partnership Project 2 (3GPP2). In other embodiments, other types of wireless protocols, such as other versions of CDMA-based wireless protocols or TDMA (time-division multiple access) protocols, can be used for communications in the wireless communications network 10.

Although not shown, the wireless communications network 10 is capable of performing circuit-switched communications, which typically involve the use of a base transceiver subsystem (BTS), a base station controller (BSC), and a mobile switching center (MSC). In one example, the BTS and BSC are part of a 1×RTT system, which supports both circuit-switched and packet-switched services. For purposes of the present invention, the presence or lack thereof of a 1×RTT or other like system is not important.

Packet-switched services involve the communication of packet data between a mobile station and another endpoint, which can be a terminal coupled to a packet data network 34 or another mobile station that is capable of communicating packet data. Examples of the packet data network 34 include wireless and wireline private networks (such as local area networks or wide area networks) and public networks (such as the Internet).

Packet-switched services involve packet-switched communications. In some embodiments, packet-switched communications are defined by the Internet Protocol (IP). In packet-switched communications, packets or other units of data carry payload (including user data) as well as routing information (in the form of addresses) for routing the packets or data units over one or more paths of the network to a destination endpoint. One version of IP, referred to as IPv4, is described in Request for Comments (RFC) 791, entitled "Internet Protocol," dated September 1981; and another version of IP, referred to as IPv6, is described in RFC 2460, entitled "Internet Protocol, Version 6 (IPv6) Specification," dated December 1998.

The wireless communications network 10 can also include a 1×EV-DO or 1×EV system that supports packet-switched services. One version 1×EV-DO is defined in the TIA/EIA/IS-856 standard, entitled "CDMA 2000 High Rate Packet Data Air Interface Specification." The 1×EV-DO (or HRPD) wireless communications system includes a base station 14 (also referred to as an access point) and a radio network controller (RNC) 40. The base station 14 and RNC 40 collectively are one example of wireless access equipment. The base station 14 communicates over radio frequency (RF) or other wireless links with a mobile station 43.

The RNC 40 includes an access network controller (ANC) 18 and a packet control function (PCF) 46 that provide data connectivity between the mobile station 43 and a packet-switched data network (such as the packet data network 34) through a packet data serving node (PDSN) 30. The RNC 40 provides coverage in a cell or cell sector 41. More generally, reference is made to a "cell segment," which refers to either a cell or cell sector. Other cell segments similar to cell segment 41 are also present in the wireless communications network shown in FIG. 1.

Although one implementation is described in the context of a 1×EV-DO system, other types of wireless systems can be used in other implementations. For example, other embodiments of the invention can be applied to other packet-switched wireless protocols, such as the 1×EV-DV protocol (another CDMA 2000-based protocol that provides both voice and data communications), UMTS (Universal Mobile Telecommunication System) protocol (based on the wideband CDMA protocol), and MCDV (multi-carrier data-voice) protocol (from Nortel Networks). A UMTS-based protocol that supports packet-switched communications is High Speed Downlink Packet Access (HSDPA), described in 3GPP TR 25.855, "High Speed Downlink Packet Access: Overall UTRAN Description." Also, as used here, "1×EV" refers to either 1×EV-DO or 1×EV-DV.

As further shown in FIG. 1, the wireless link between the mobile station 43 and the RNC 40 includes a forward link 50 (from the RNC to the mobile station) and a reverse link 52 (from the mobile station to the RNC). Generally, the forward link 50 refers to a wireless link to communicate data and signaling from wireless access equipment to a mobile station in a cell or cell sector, and the reverse link 52 refers to a wireless link to communicate data and signaling from the mobile station to the wireless access equipment. "Wireless access equipment" refers to any network equipment, such as the RNC, that is capable of wirelessly communicating with mobile stations.

The data rate of data traffic communicated in the forward link 50 is controlled by an indication in a data rate control (DRC) channel. The DRC channel is used by the mobile station 43 to indicate to the RNC 40 the requested forward traffic channel data rate, as well as the selected serving cell sector on the forward link. The forward traffic channel data rate specifies the data rate to be used in the forward traffic channel for carrying user traffic and other data.

In the physical layer of the air interface between the RNC 40 and the mobile station 43, a unit of transmission is referred to as a physical layer packet. A physical layer packet can be used to communicate both control signaling as well as data traffic. The physical layer packet for communicating data traffic in the forward link 50 is referred to as a forward traffic channel physical layer packet. In one version of 1×EV-DO, such as IS-856, the forward traffic channel physical layer packet can be one of four sizes: 1,024 bits, 2,048 bits, 3,072 bits, or 4,096 bits. The size of the forward traffic channel physical layer packet is determined by the data rate specified in the DRC channel. The higher the data rate specified by a mobile station, the larger the forward traffic channel physical layer packet that is used. Thus, a larger physical layer packet is used to carry more data for applications that require higher data rates.

Figure 2:
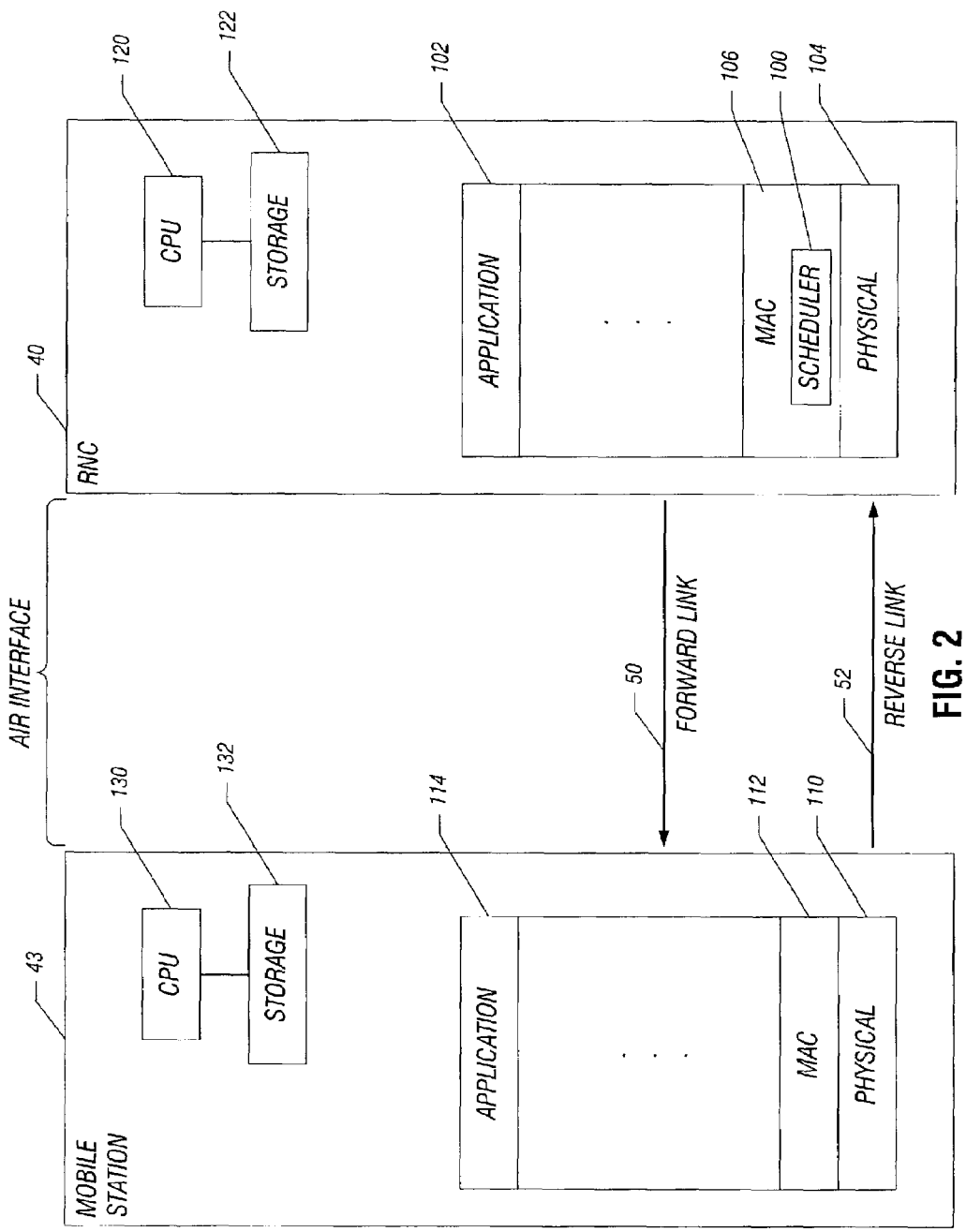
FIG. 2 illustrates various layers of the air interface between a mobile station and wireless access equipment.

The forward link 50 of 1×EV-DO system uses a time division multiplexed (TDM) technique for communicating data. The TDM technique defines multiple time slots in the forward link 50, with time slots assigned to the mobile station on an as-needed basis. As shown in FIG. 2, the RNC 40 includes a scheduler 100 that operates according to a predefined scheduling algorithm to allocate a time slot for the communication of data to one of multiple mobile stations over the forward link 50. In one embodiment, the scheduler 100 uses a scheduler algorithm that allocates a time slot to a user that has the largest ratio of data requested to the average throughput. In other words, a user (or mobile station) is given higher priority if the user requests a higher data rate but the average throughput for the user is less than the requested data rate. In effect, the scheduler 100 provides a scheduling procedure for wireless communications with mobile stations that controls which time slot is assigned to communications with one of the mobile stations.

As noted above, the forward traffic channel physical layer packet varies in size depending upon the data rate requested by a mobile station on the forward link 50. Depending on the size of the forward traffic channel physical layer packet, the physical layer packet can store one to four higher protocol layer packets, such as medium access control (MAC) filler packets. For data communicated over the forward link 50 to a specific mobile station, the RNC 40 may not have enough MAC packets to fill up an entire forward traffic channel physical layer packet. If that occurs, the RNC 40 inserts filler packets into the physical layer packet, and the physical layer packet is communicated over the forward link 50. A filler packet or filler information is information that has no meaningful use and is provided to fill gaps in a packet or frame.

Communicating filler information wastes resources in the forward link 50 from the RNC 40 to the mobile station 43. If the mobile station 43 requests a high data rate in the DRC channel, but the application software (or other component) in the RNC 40 does not actually need such a high data rate in the forward link 50, then there may be a relatively large number of instances in which filler packets are inserted into the forward traffic channel physical layer packet. Thus, the scheduler 100 may assign time slots in the forward link 50 for communication with a given mobile station that has requested a high data rate more often than for communication with other mobile stations, even though such a high data rate is not required. The result is that some amount of the air interface will be used for communicating unnecessary data, which may cause the performance of communications with other mobile stations to suffer.

In accordance with some embodiments of the invention, an adaptive scheduling technique is used by the scheduler 100 to avoid or reduce the allocation of bandwidth to communications with a given mobile station when such allocation is not needed. As a result, more efficient usage of resources in the forward link 50 can be achieved using the scheduler 100 in accordance with some embodiments of the invention. The adaptive scheduling technique matches the physical layer throughput (over the air interface between the RNC 40 and the mobile station 43) to the data rate required by the application layer 102 in the RNC 40 (as shown in FIG. 2). Thus, despite a high data rate requested by the mobile station, the scheduler 100 is able to reduce the effective data rate of communications to the mobile station 43 if the scheduler 100 determines that the application layer 102 does not require the requested high data rate, or if conditions in the network do not permit transmission at the requested rate.

FIG. 2 further shows other layers of the protocol stack in the air interface between the RNC 40 and the mobile station 43. The application layer 102 is the highest protocol layer. At the bottom of the protocol stack is a physical layer 104, which provides the wireless channel structure, frequency, power output, modulation, and encoding specifications for the wireless link. Above the physical layer 104 is a medium access control (MAC) layer 106, which defines procedures used to receive and to transmit over the physical layer 104. Other layers (not shown) are provided between the MAC layer 106 and the application layer 102. Note that the protocol stack illustrated in FIG. 2 is provided as an example only, as other embodiments may have other types and/or configurations of protocol layers. Note that some of the layers may actually be located outside the RNC 40. For example, the physical layer 104 may reside in the AP 14, and the application layer 102 may be located in another entity separate from the RNC 40.

In one embodiment, the scheduler 100 is part of the MAC layer 106 in the RNC 40. However, the scheduler 100 can be provided in other layers (or combinations of layers) of the RNC 40.

The mobile station 43 also includes a protocol stack that has protocol layers corresponding to the protocol layers of the RNC 40. The protocol stack of the mobile station 43 includes a physical layer 110, a MAC layer 112, an application layer 114, and various layers between the MAC layer 112 and the application layer 114. Again, some of the protocol layers may be located in separate entities.

Tasks of the mobile station 43 are controlled by software stored in storage 132 and executable on a central processing unit (CPU) 130. Similarly, tasks of the RNC 40 are controlled by software stored in storage 122 and executable on a CPU 120 (or multiple CPUs).

Figure 3:
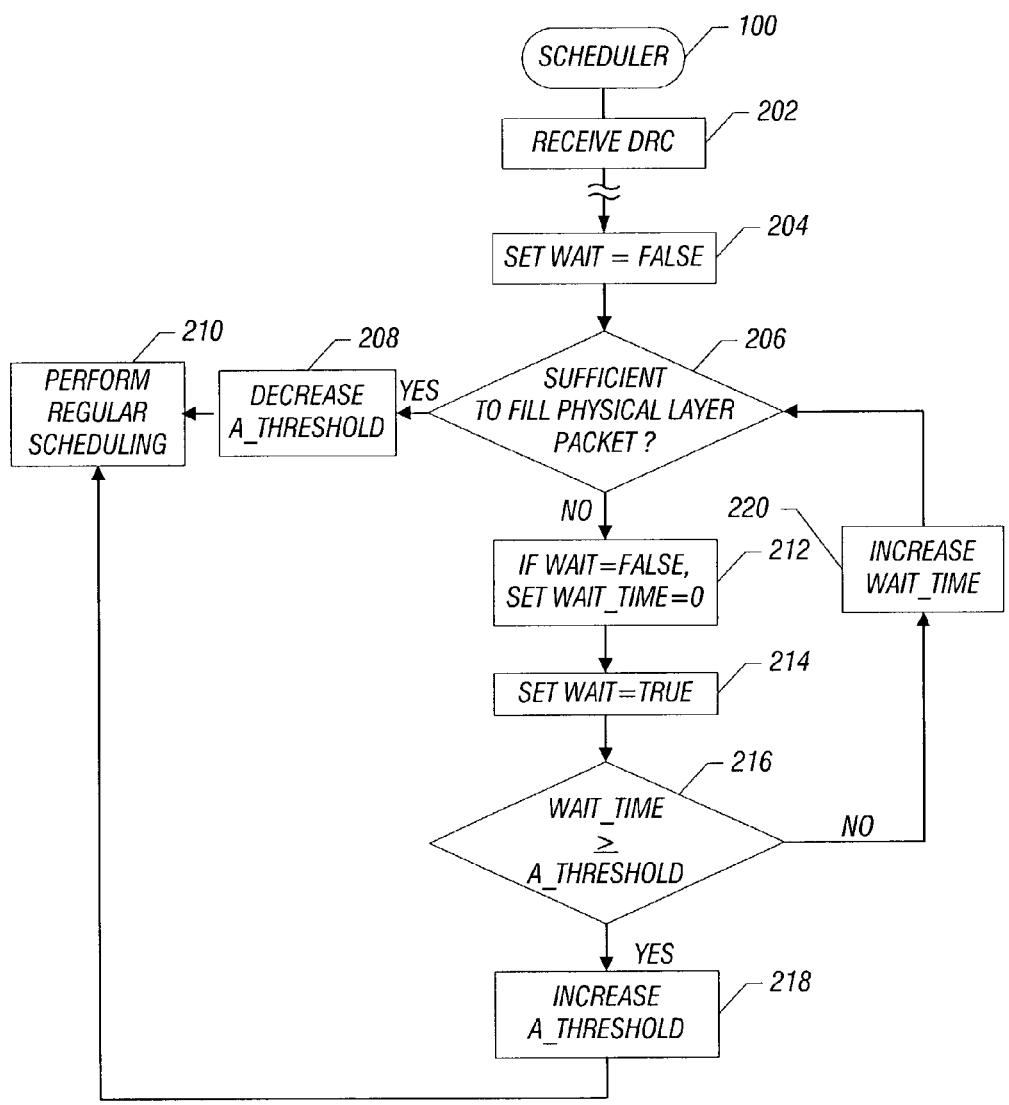
FIG. 3 is a flow diagram of a process of controlling the data rate of communications over a forward wireless link from the wireless access equipment to the mobile station, in accordance with one embodiment.

FIG. 3 shows a process performed by the scheduler 100 in allocating access to the forward link 50 for communications with mobile stations 43 in the cell sector 41. Since TDM is used in one embodiment, the allocation of access involves the allocation of a time slot. However, in other embodiments that use other access techniques, the scheduler 100 can assign access to a physical resource in another way. The scheduler 100 receives (at 202) the data rate information in the DRC channel from the mobile station 43. Generally, the scheduler 100 determines if the forward traffic channel data rate specified in the DRC channel does not match the data rate required by the application layer 102 for communications with a given mobile station 43. The following procedure discusses how the scheduler 100 performs such a determination and what the scheduler 100 does when it determines that the application layer 102 in the RNC 40 does not require the requested data rate in the forward link 50 for communications with the given mobile station.

A WAIT parameter is set to a false state (at 204). The WAIT parameter indicates whether the scheduler 100 is to delay or not the transmission of a physical layer packet over the forward link 50 to a given mobile station 43. The scheduler 100 determines (at 206) if there are sufficient MAC packets to fill a forward traffic channel physical layer packet to the given mobile station 43. If there are sufficient MAC packets to send over the forward link 50, then the resources of the forward link 50 will be used efficiently and scheduling of the physical layer packet for transmission can proceed normally. Thus, if there are sufficient MAC packets to fill a physical layer packet, the scheduler 100 decreases (at 208) the value of an A_THRESHOLD parameter (at 208), and performs regular scheduling (at 210).

The A_THRESHOLD parameter represents a threshold or maximum wait time before a partially filled physical layer packet is scheduled for transmission. In other words, even though it is desired that a physical layer packet be filled completely with MAC packets before it is transmitted, the wait time should not be too large so that a user at the mobile station 43 will experience excessive delay. As a result, the A_THRESHOLD parameter is set to some value to prevent excessive delay. The A_THRESHOLD parameter can have an initial value of zero. Also, the A_THRESHOLD is allowed to increment to some maximum predefined value.

If the physical layer packet cannot be completely filled (as determined at 206), that is an indication that the data rate at which the RNC 40 is receiving data to be transmitted to the mobile station is less than the data rate requested by the mobile station in the DRC. In this case, there may not be enough MAC packets to fill the physical layer packet. The scheduler 100 determines if the state of the WAIT parameter is false; if so, the scheduler 100 sets (at 212) a WAIT_TIME parameter to a zero value (or some other predetermined minimum value). The WAIT_TIME parameter can be provided by a counter, with the counter counting up to the A_THRESHOLD value. Thus, initially, or whenever the WAIT parameter is false, there is no or little delay in sending out a partially filled physical layer packet (that contains filler information) to a given mobile station. Next, the scheduler 100 sets the WAIT parameter to a true state (at 214). This indicates that some wait time is required to allow a partially filled physical layer packet to be filled. The scheduler 100 then determines (at 216) if the WAIT_TIME parameter is greater than or equal to the A_THRESHOLD parameter. The scheduler 100 does this to determine if the wait time in delaying transmission of a physical layer packet to a given mobile station 43 has exceeded the threshold wait time (in the A_THRESHOLD parameter).

If the WAIT_TIME parameter is greater than or equal to the A_THRESHOLD parameter, the scheduler 100 follows the "yes" branch from 216, and increases the value of the A_THRESHOLD parameter (at 218). The scheduler 100 then performs regular scheduling (at 210) of the partially filled physical layer packet.

On the other hand, if the scheduler 100 determines (at 216) that the WAIT_TIME parameter is less in value than the threshold wait time (A_THRESHOLD), the scheduler 100 increments (at 220) the value of the WAIT_TIME parameter by some predefined amount. The scheduler 100 then proceeds to determine (at 206) if there are sufficient MAC layer packets to fill the physical layer packet, and the procedure outlined in 206-230 is repeated.

The scheduler 100 is able to adjust the effective data rate from the RNC 40 to a given mobile station based on the needs of an application in the RNC 40. Thus, even if the mobile station requests a high data rate in the forward traffic channel, the scheduler 100 is able to transmit in the forward traffic channel at effectively lower data rate if the scheduler 100 determines that the requested higher data rate is not needed (in other words, the rate at which the RNC 40 is receiving data is greater than the data rate requested by the mobile station). The scheduler 100 varies the effective data rate by varying the wait time to fill partially filled outbound physical layer packets. The effective data rate is reduced by increasing the wait time (set in the A_THRESHOLD parameter in the example embodiment discussed above). By providing greater opportunity to fill physical layer packets before such packets are transmitted, more efficient usage of the air interface resources can be achieved.

The tasks performed by the scheduler 100 (and other software components) are provided by software routines or modules in the RNC 40. Instructions of such software routines or modules are stored on one or more storage devices in the corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software are loaded or transported to each entity in one of many different ways. For example, code segments including instructions stored on floppy disks, CD or DVD media, a hard disk, or transported through a network interface card, modem, or other interface device are loaded into the entity and executed as corresponding software routines or modules. In the loading or transport process, data signals that are embodied in carrier waves (transmitted over telephone lines, network lines, wireless links, cables, and the like) communicate the code segments, including instructions, to the entity. Such carrier waves are in the form of electrical, optical, acoustical, electromagnetic, or other types of signals.

While the invention has been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A method of wireless communication, comprising:
   receiving an indication of a data rate for communicating data over a wireless link between a mobile station and wireless access equipment;
   determining whether the data rate specified by the indication is greater than a rate at which data to be communicated over the wireless link is received by one of the mobile station and wireless access equipment;
   reducing an effective data rate of communicating data over the wireless link in response to a determination that the data rate specified by the indication is greater than the rate at which data to be communicated over the wireless link is received; and
   varying a size of a physical layer packet for communicating data over the wireless link based on the data rate specified by the indication,
   wherein the physical layer packet is capable of carrying plural higher protocol layer packets, and
   wherein reducing the effective data rate comprises waiting to fill the physical layer packet with one or more additional higher level packets.

2. The method of claim 1, wherein waiting to fill the physical layer packet comprises waiting up to a set maximum time.

3. The method of claim 2, further comprising transmitting a partially filled physical layer packet in response to waiting greater than the set maximum time.

4. The method of claim 1, further comprising varying a wait time in waiting to fill the physical layer packet to vary the effective data rate.

5. A method of wireless communication, comprising:
   receiving an indication of a data rate for communicating data over a wireless link between a mobile station and wireless access equipment;
   determining whether the data rate specified by the indication is greater than a rate at which data to be communicated over the wireless link is received by one of the mobile station and wireless access equipment; and reducing an effective data rate of communicating data over the wireless link in response to a determination that the data rate specifiedby the indication is greater than the rate at which data to be communicated over the wireless link is received, wherein determining whether the data rdte specified by the indication is greater than the rate a: which data to be communicated over the wireless link is received comprises detecting that an outbound physical layer packet is partially filled.

6. The method of claim 5, wherein reducing the effective data rate of communicating data over the wireless link comprises waiting to fill the outbound physical layer packet.

7. An article comprising at least one storage medium containing instructions that when executed cause a system to:

provide a scheduling procedure for wireless communications between a mobile station and a wireless access equipment;

receive a specified data rate for the wireless communications;

provide an effective data rate that is different from the specified data rate in response to determining that the specified data rate is greater than a rate needed by one of the mobile station and the wireless access equipment; and vary the effective data rate by controlling a wait time to fill a physical layer packet to be communicated between the mobile station and the wireless access equipment.

8. The article of claim 7, wherein the instructions when executed cause the system to perform the determining by detecting that an outbound physical layer packet is partially filled.

9. The article of claim 7, wherein the instructions when executed cause the system to receive the specified data rate by receiving a data rate for communicating data over a forward traffic channel of the wireless link.

10. The article of claim 7, wherein the instructions when executed cause the system to receive the specified data rate by receiving a forward channel data rate indication according to a packet-switched wireless protocol.

11. The article of claim 7, wherein the instructions when executed cause the system to insert medium access control (MAC) packets into the physical layer packet.

12. The article of claim 7, wherein the instructions when executed cause the system to transmit a partially filled physical layer packet in response to waiting greater than a set maximum time.

13. The article of claim 7, wherein the instmctions when exectited cause the system to receive the specified data rate by receiving the specified data rate in a data rate control (DRC) channel according to a 1xEV protocol.

14. The article of claim 7, wherein the wireless communications is defined by one of a 1xEV-DO protocol, 1xEV-DV protocol, and UMTS-based protocol.

15. The article of claim 7, wherein the system is one of the mobile station and wireless access equipment.

16. A wireless network control apparatus, comprising:

an interface to a wireless link for communicating wirelessly with a mobile station; and a controller adapted to:

receive a specified data rate for communicating data with the mobile station, determine whether the specified data rate is greater than a rate at which data to be communicated wirelessly is needed by the wireless network control apparatus, provide an effective data rate in communicating the data with the mobile station, the effective data rate being different from the specified data rate, in response to determining that the specified data rate is greater than the rate at which data to be communicated wireiessly is needed by the wireless network control apparatus, and vary the effective data rate by controlling a wait time to fill a physical layer packet to be communicated between the wireless network control apparatus and the mobile station.

17. The wireless network control apparatus of claim 16, wherein the controller is adapted to receive the specified data rate from the mobile station, the specified data rate specifying a data rate for communicating data over a forward traffic channel of the wireless link.

18. The wireless network control apparatus of claim 16, wherein the controller is adapted to transmit a partially filled physical layer packet in response to waiting greater than a set maximum time.

19. The wireless network cono-ol apparatus of claim 16, wherein the interface is adapted to communicate over the wireless link according to one of a 1xEV-DO, 1xEV-DV protocol, and HSDPA protocol.

20. The wireless network control apparatus of claim 16, wherein the controller is adapted to receive the specified data rate by receiving the specified data rate in a data rate control (DRC) channel according to a 1xEV protocol.

* * * * *